United States Patent
Chung et al.

(10) Patent No.: US 9,057,139 B2
(45) Date of Patent: Jun. 16, 2015

(54) METHOD FOR MANUFACTURING ELECTRODE MODULE FOR RECOVERY OF METAL IONS, ELECTRODE MODULE FOR RECOVERY OF METAL IONS, AND APPARATUS FOR RECOVERY OF METAL IONS INCLUDING THE SAME

(75) Inventors: Kang-Sup Chung, Daejeon (KR); Tae Gong Ryu, Daejeon (KR); Jae Chun Ryu, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 0 days.

(21) Appl. No.: 13/640,940

(22) PCT Filed: Apr. 13, 2012

(86) PCT No.: PCT/KR2012/002808
§ 371 (c)(1),
(2), (4) Date: Oct. 12, 2012

(87) PCT Pub. No.: WO2013/015509
PCT Pub. Date: Jan. 31, 2013

(65) Prior Publication Data
US 2014/0158527 A1    Jun. 12, 2014

(30) Foreign Application Priority Data
Jul. 26, 2011    (KR) .......................... 10-2011-0074080

(51) Int. Cl.
*C02F 1/42*    (2006.01)
*C02F 1/28*    (2006.01)
(Continued)

(52) U.S. Cl.
CPC .............. *C25C 7/02* (2013.01); *C02F 1/46109* (2013.01); *C02F 2001/46138* (2013.01);
(Continued)

(58) Field of Classification Search
CPC ...... C02F 1/4691; C02F 2103/08; C02F 1/42; C02F 1/28
USPC .......................................... 204/242, 263, 280
See application file for complete search history.

(56) References Cited

U.S. PATENT DOCUMENTS

2011/0090620 A1* 4/2011 Liu et al. ........................ 361/500
2013/0153426 A1* 6/2013 Sun et al. ...................... 204/638

FOREIGN PATENT DOCUMENTS

KR    1020100036495    * 4/2010 ............. B01D 61/50
KR    1020110045145    5/2011
(Continued)

OTHER PUBLICATIONS

English Translation of KR 10-2011-0080893 to Kim; Jul. 2011.*
(Continued)

*Primary Examiner* — Zulmariam Mendez
(74) *Attorney, Agent, or Firm* — Timothy S. Westby; Porter Hedges LLP

(57) ABSTRACT

The present invention relates to a method for manufacturing an electrode module for recovery of metal ions, an electrode module for recovery of metal ions, and an apparatus for recovery of metal ions including the same. The present invention provides a method for manufacturing an electrode module for recovery of metal ions, the method including the steps of: a) preparing a first electrode part and a second electrode part for electrically adsorbing or desorbing metal ions contained in a liquid; and b) interposing an insulating layer, through which the liquid passes, between the first electrode part and the second electrode part, an electrode module for recovery of metal ions manufactured by the method, and an apparatus for recovery of metal ions including the same. According to the present invention, it is possible to significantly reduce the time required for the adsorption and desorption of ions when specific valuable metal ions are recovered from an aqueous solution in which various valuable metal ions are dissolved.

4 Claims, 8 Drawing Sheets

(51) Int. Cl.
*C25C 7/02* (2006.01)
*C02F 1/461* (2006.01)
*B05D 1/28* (2006.01)
*B05D 7/00* (2006.01)
*C02F 101/20* (2006.01)
*C02F 103/08* (2006.01)
*C02F 1/469* (2006.01)

(52) U.S. Cl.
CPC ........ *C02F 2101/20* (2013.01); *C02F 2103/08* (2013.01); *B05D 1/28* (2013.01); *B05D 7/584* (2013.01); *C02F 1/4691* (2013.01); *C02F 2201/46115* (2013.01)

(56) References Cited

FOREIGN PATENT DOCUMENTS

| KR | 1020110071701 | 6/2011 |
| KR | 1020110080893 | 7/2011 |
| KR | 101136816 B1 | 4/2012 |
| WO | 2013015509 | 1/2013 |

OTHER PUBLICATIONS

English Translation of KR 10-2010-0036495 to Noh; Apr. 2010.*
Kim et al., "Fabrication and Characterization of a Carbon Electrode Coated with Cation-Exchange Polymer for the Membrane Capacitive Deionization Applications," Journal of Membrane Science; 355; pp. 85-90, (6 pgs).
Kim et al., "Enhanced Desalination Efficiency in Capacitive Deionization with an Ion-Selective Membrane," Separation and Purification Technology; 71, 2010 (6 pgs.).
Search Report and Written Opinion dated Dec. 3, 2012 for International Application No. PCT/KR2012/002808 (11 pgs.).
Korean Office Action dated Oct. 18, 2011 issued in corresponding Korean Application No. 10-2011-0074080 (14 pgs.).
Korean Office Action dated Dec. 5, 2011 issued in corresponding Korean Application No. 10-2011-0074080 (6 pgs.).
Search Report and of Written Opinion dated Dec. 3, 2012 for International Application No. PCT/KR2012/002808 (14 pgs.).

* cited by examiner

METHOD FOR MANUFACTURING ELECTRODE MODULE FOR RECOVERY OF METAL IONS, ELECTRODE MODULE FOR RECOVERY OF METAL IONS, AND APPARATUS FOR RECOVERY OF METAL IONS INCLUDING THE SAME

TECHNICAL FIELD

The present invention relates to a method for manufacturing an electrode module for recovery of metal ions, an electrode module for recovery of metal ions, and an apparatus for recovery of metal ions including the same. More particularly, the present invention provides a method for manufacturing an electrode module for recovery of metal ions, an electrode module for recovery of metal ions, and an apparatus for recovery of metal ions including the same, which can recover only specific valuable metal ions from an aqueous solution such as seawater, etc., which passes through electrodes, using an electric field.

BACKGROUND ART

It is expected that the problem of depletion of valuable metal mineral resources, which has recently become an issue, will be an obstacle to the development of human civilization in the near future.

For example, lithium mineral resources are the raw materials for various IT-related products such as cellular phones, notebook computers, camcorders, etc., which play a significant role in the growth of the Korea economy, as well as for secondary batteries required for hybrid electric vehicles, and are a national strategic metal used in special alloys for aircraft, fuels for thermonuclear power generation, etc.

The reserves of lithium mineral resources in terms of their economics are about 4.1 million tons all over the world and are scarce resources that are expected to be depleted within the next ten years.

Conventional technologies for the recovery of lithium resources from the nature typically include a method for recovering lithium from ore by roasting and sulfuric acid leaching, a method for recovering lithium from a saline lake, a method for recovering lithium from seawater, etc.

The world's lithium resources are mainly concentrated in some countries, and it is practically impossible to extract lithium from the ore and saline lake in Korea where the lithium reserves are minimal However, it is known that even though the concentration lithium in seawater is very low, i.e., 0.17 mg/L, the total amount of lithium dissolved in seawater is tremendous, i.e., about 230 billion tons.

Accordingly, a mineral recovery method, which can selectively extract specific valuable metal ions dissolved in seawater, can reduce the dependency on overseas resources and ensure stable supply of resources. Thus, it can be said that the mineral recovery method is a very important technology that has a high value as an engine for the economic growth of Korea and contributes to the sustainable development of the national economy.

Most of the conventional technologies for the recovery of valuable metals from seawater have been developed based on the ion-exchange and adsorption of inorganic or organic materials for the selective removal of specific metal ions.

Typically, lithium ions are recovered by embedding inorganic compound particles such as manganese oxide into a polymer such as polyvinyl chloride (PVC) or by selectively ion-exchanging lithium ions in a storage comprising a polymer membrane, followed by acid treatment.

The above-described conventional technologies have the advantage of high recovery of lithium ions. However, the time required for the adsorption of specific ions is very long, and thus the economy and efficiency of these technologies are low. Moreover, it is necessary to use toxic materials such as acids in a post-treatment process for the recovery of ions, which causes various problems such as system corrosion, environmental pollution, etc.

TECHNICAL PROBLEM

Accordingly, the present invention has been made to solve the above-described problems, and an object of the present invention is to provide a method for manufacturing an electrode module for recovery of metal ions, an electrode module for recovery of metal ions, and an apparatus for recovery of metal ions including the same, which can recover only specific valuable metal ions from aqueous solutions, in which valuable metals are dissolved, using an electric field, without using acidic materials or reagents that cause environmental pollution.

TECHNICAL SOLUTION

The present invention provides a method for manufacturing an electrode module for recovery of metal ions, the method comprising the steps of: a) preparing a first electrode part and a second electrode part for electrically adsorbing or desorbing metal ions contained in a liquid; and b) interposing an insulating layer, through which the liquid passes, between the first electrode part and the second electrode part.

In step a), the preparation of the first electrode part may be achieved by forming a current electrode layer to which electricity is applied, coating a porous carbon electrode layer on the current collector layer, and coating an adsorbent layer on the porous carbon electrode layer.

In step a), the preparation of the second electrode part may be achieved by forming a current electrode layer to which electricity is applied, coating a porous carbon electrode layer on the current collector layer, and attaching an anion-exchange membrane to the porous carbon electrode layer.

The current collector layer may be formed by any one selected from a group consisting of a conductive metal, a graphite plate, and a polymer film coated with conductive carbon.

The porous carbon electrode layer may be formed by mixing active carbon, carbon aerogel, or a mixture thereof with a binder solution, in which polyvinylidene fluoride is dissolved in an organic solvent, in a mass ratio of 6:4 to 9.5:0.5 to form a mixture, coating the mixture on the current collector layer, and drying the resulting current collector layer.

The adsorbent layer may comprise a lithium manganese oxide.

The graphite plate may be formed with a thickness of 50 to 1,000 μm and the polymer film coated with the conductive carbon may be formed by coating conductive carbon at a thickness of 0.03 to 100 μm on a polymer film having a thickness of 50 to 500 μm.

The insulating layer may be formed with non-woven fabric having a pore size of 30 to 300 mesh.

Moreover, the present invention provides an electrode module for recovery of metal ions, the electrode module comprising: a first electrode part and a second electrode part for electrically adsorbing or desorbing metal ions contained in a liquid: and an insulating layer interposed between the first electrode part and the second electrode part to electrically insulate the first electrode part and the second electrode part and to allow the liquid to pass therethrough.

The first electrode part may comprise a current collector layer, to which electricity is applied, a porous carbon electrode layer coated on the current collector layer, and an adsorbent layer coated on the porous carbon electrode layer, the second electrode part may comprise a current collector layer to which electricity is applied, a porous carbon electrode layer coated on the current collector layer, and an anion-exchange membrane attached to the porous carbon electrode layer, and the adsorbent layer and the anion-exchange layer may be arranged to face each other.

Moreover, the first electrode part may comprise a current collector layer to which electricity is applied, and an adsorbent layer comprising active carbon, carbon aerogel, or a mixture thereof and coated on the current collector layer, the second electrode part may comprise a current collector layer to which electricity is applied, a porous carbon electrode layer coated on the current collector layer, and an anion-exchange membrane attached to the porous carbon electrode layer, and the adsorbent layer and the anion-exchange layer may be arranged to face each other.

The electrode module may have the form of a laminate by laminating a plurality of unit modules or have the form of a cylinder by winding one or more unit modules.

Furthermore, the present invention provides an apparatus for recovery of metal ions, the apparatus comprising: an electrode module for recovery of metal ions which comprises a first electrode part including a current collector layer to which electricity is applied, a porous carbon electrode layer coated on the current collector layer, and an adsorbent layer coated on the porous carbon electrode layer, a second electrode part including a current collector layer to which electricity is applied, a porous carbon electrode layer coated on the current collector layer, and an anion-exchange membrane attached to the porous carbon electrode layer, and an insulating layer interposed between the first electrode part and the second electrode part to insulate the first electrode part and the second electrode part; a power supply which supplies electricity to each of the current collector layers; and a metering pump which feeds a liquid containing metal ions or deionized water into the electrode module for recovery of metal ions.

Advantageous Effects

The present invention can significantly reduce the time required for the adsorption and desorption of ions when specific valuable metal ions are recovered from an aqueous solution in which various valuable metal ions are dissolved.

Moreover, the present invention uses the electric field instead of using toxic solutions such as acids, and thus it is environmentally friendly.

BEST MODE FOR CARRYING OUT THE INVENTION

Figure 1:
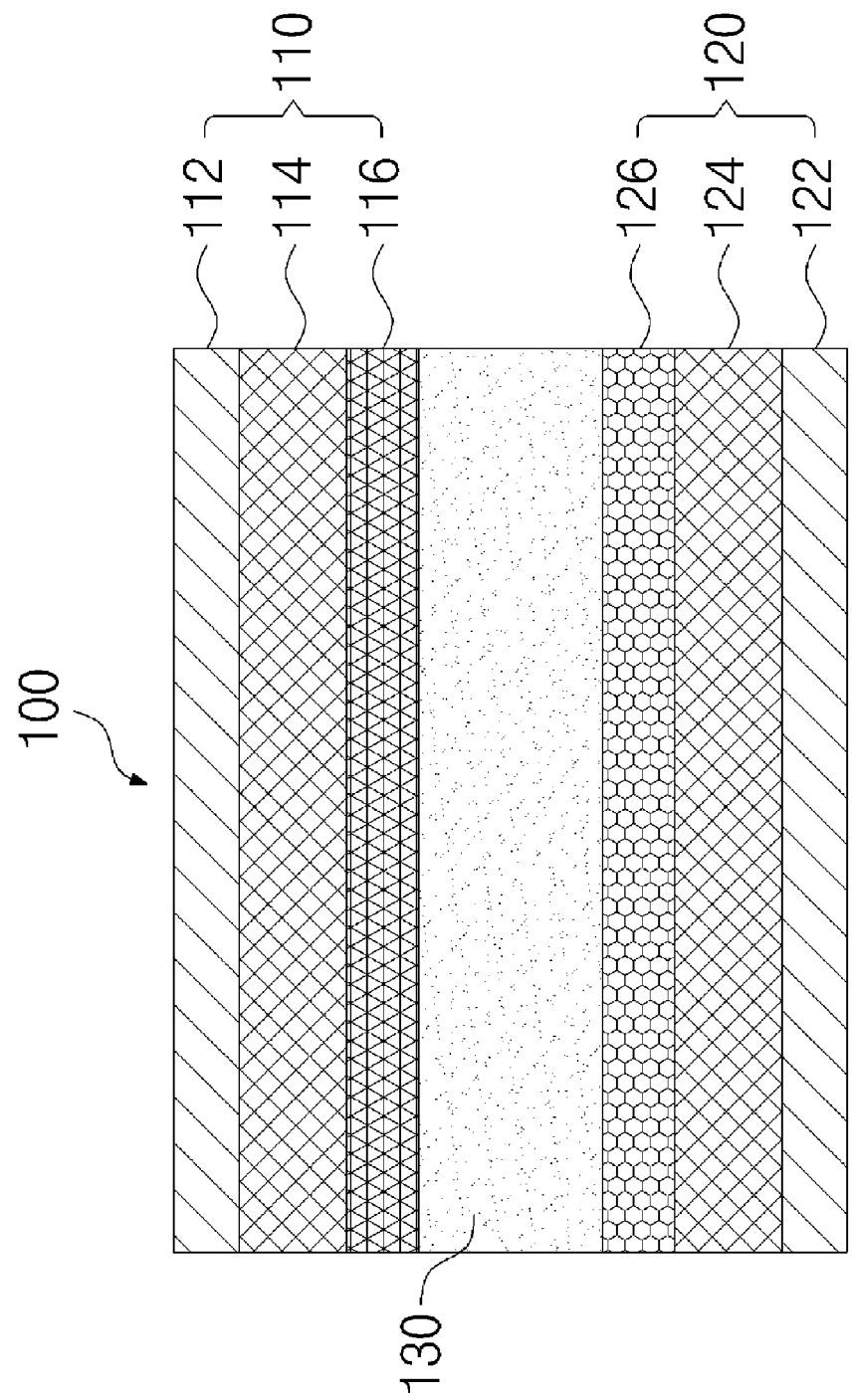
FIG. 1 is a cross-sectional view of an electrode module for recovery of metal ions in accordance with an exemplary embodiment of the present invention.

Hereinafter, exemplary embodiments of the present invention will be described in detail with reference to the accompanying drawings. First of all, it should be noted that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be implemented by those skilled in the art.

FIG. 1 is a cross-sectional view of an electrode module for recovery of metal ions in accordance with an exemplary embodiment of the present invention.

Referring to FIG. 1, an electrode module 100 for recovery of metal ions in accordance with an exemplary embodiment of the present invention will now be described.

The electrode module 100 for recovery of metal ions in accordance with an exemplary embodiment of the present invention comprises a first electrode part 110, a second electrode part 120, and an insulating layer 130.

The first electrode part 110 and the second electrode part 120 serve to electrically adsorb or desorb metal ions contained in an aqueous solution such as seawater.

In detail, the first electrode part 110 comprises a current collector layer 112 to which electricity is applied, a porous carbon electrode layer 114 coated on the current collector layer 112, and an adsorbent layer 116 coated on the porous carbon electrode layer 114.

The second electrode part 120 comprises a current collector layer 122 to which electricity is applied, a porous carbon electrode layer 124 coated on the current collector layer 122, and an anion-exchange membrane 126 attached to the porous carbon electrode layer 124, not to the adsorbent layer 116 unlike the first electrode part 110.

The insulating layer 130 is interposed between the first electrode part 110 and the second electrode part 120 to electrically insulate the first electrode part 110 and the second electrode part 120 and to allow the aqueous solution to pass therethrough.

Here, the insulating layer 130 is interposed between the first electrode part 110 and the second electrode part 120 so as to be in contact with the adsorbent layer 116 and the anion-exchange membrane 126. In other words, the adsorbent layer 116 and the anion-exchange layer 126 are arranged to face each other.

Figure 2:
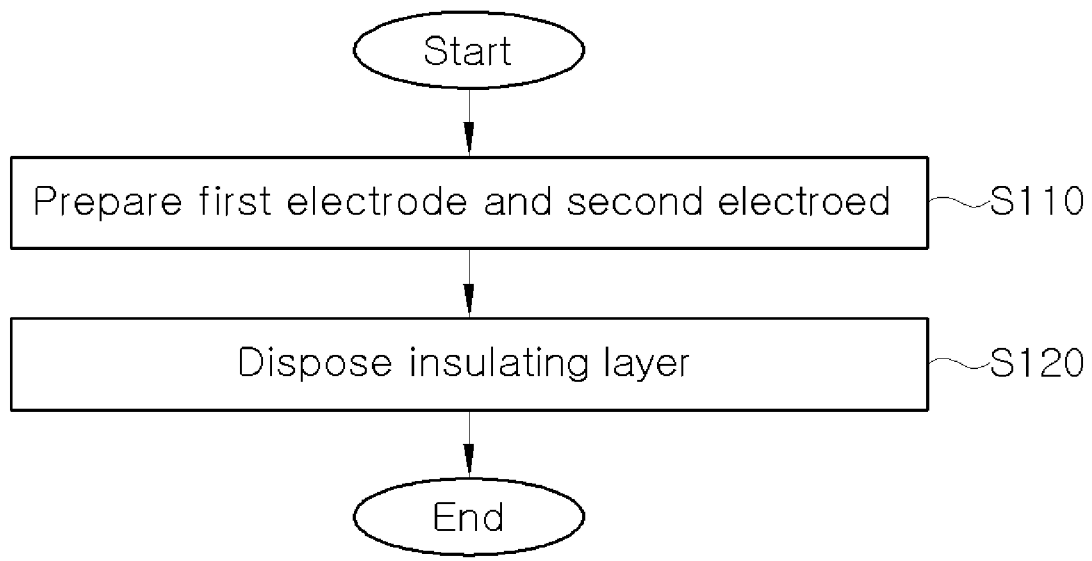
FIG. 2 is a flowchart showing a process of manufacturing an electrode module for recovery of metal ions in accordance with an exemplary embodiment of the present invention.
Figure 3:
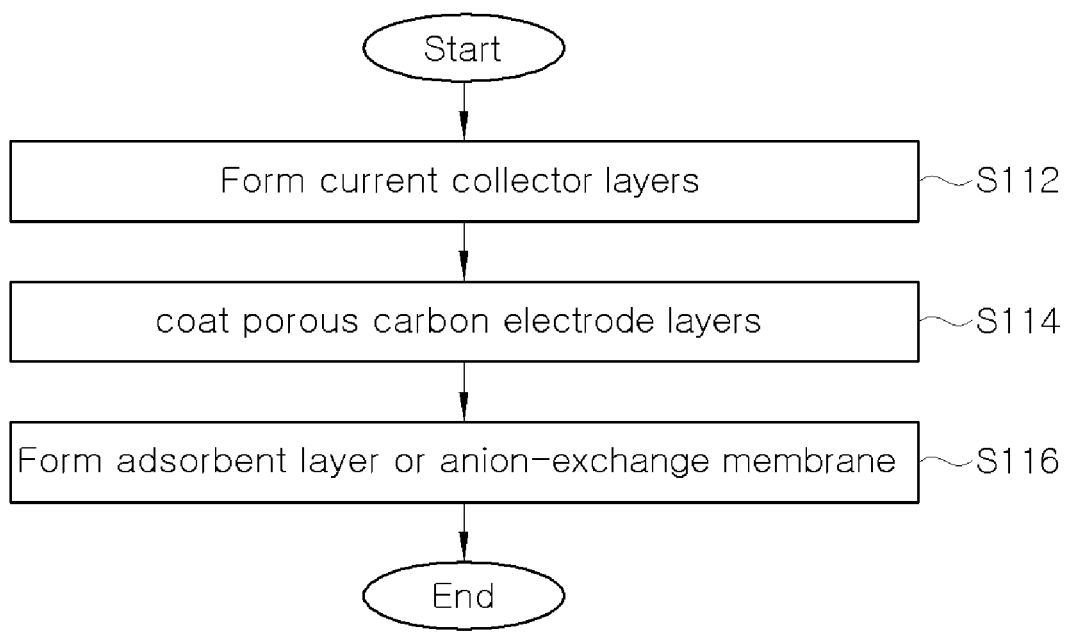
FIG. 3 is a flowchart showing a process of manufacturing a first electrode part or a second electrode part.

FIG. 2 is a flowchart showing a process of manufacturing an electrode module for recovery of metal ions in accordance with an exemplary embodiment of the present invention, and FIG. 3 is a flowchart showing a process of manufacturing a first electrode part or a second electrode part.

In order to manufacture the above-described electrode module 100 for recovery of metal ions, a first electrode part 110 and a second electrode part 120, which are configured to electrically adsorb and desorb metal ions contained in a liquid, are prepared (S110), and an insulating layer 130, through which the liquid passes, is interposed between the first electrode part 110 and the second electrode part 120 (S120).

In detail, the first electrode part 110 and the second electrode part 120 may be prepared in the order shown in FIG. 3, and the current collector layers 112 and 122 to which electricity is applied are formed first(S112).

Here, the current collector layers 112 and 122 may be formed with the graphite plate having a thickness of 50 to 1,000 μm or with a film with a conductive carbon at a thickness of 0.03 to 100 μm on a flexible polymer film having a thickness of 50 to 500 μm, or a conductive metal thin plate may be used as the current collector layers.

Porous carbon electrode layers 114 and 124 are coated on the formed current collector layers 112 and 122 (S114).

The porous carbon electrode layers 114 and 124 may be formed by coating active carbon, carbon aerogel, or a mixture thereof with a binder solution on the current collector layers 112 and 122, and then by drying the resulting coating.

In detail, the porous carbon electrode layers 114 and 124 coated on the current collector layers 112 and 122 may be formed by carbon aerogel, porous active carbon with a specific surface area of 500 $m^2/g$ or more, or a mixture of the carbon aerogel and the active carbon.

The binder solution may be used to facilitate the coating of these materials, and polyvinylidene fluoride may be preferably used as a binder contained in the binder solution.

As a solvent added for the preparation of the binder solution, any organic solvent that can dissolve polyvinylidene fluoride may be used.

For example, the organic solvent may include N,N-dimethylacetamide and N-methyl-2-pyrrolidone.

In detail, the binder solution is prepared by dissolving polyvinylidene fluoride in N,N-dimethylacetamide or N-methyl-2-pyrrolidone at 60° C. to have a concentration of 6 to 20%.

The active carbon and the prepared binder solution are mixed in a mass ratio of 6:4 to 9.5:0.5 and uniformly mixed by a homogenizer. Here, a predetermined amount of solvent may be added to control the viscosity to an appropriate level, and the solvent is preferably added in an amount of 5 to 150 wt % of the total mass of the mixture of the active carbon and the binder solution.

Next, the mixture of the active carbon and the binder solution in the form of slurry is cast on the current collector layers 112 and 122 and then coated using a blade coater or roll coater to have a predetermined thickness, preferably 30 to 500 μm.

The current collector layers 112 and 122 on which the mixture is coated are dried in an electric oven at 60 to 110° C. for about 2 hours, and then dried again in a vacuum oven at 60 to 110° C. for about 12 hours, thus are coated the porous carbon electrode layers 114 and 124.

Subsequently, an adsorbent layer 116 for adsorbing only specific metal ions or an anion-exchange membrane 126 for selectively permeating only anions is formed on the surface of the coated porous carbon electrode layers 114 and 124 (S116).

In detail, the adsorbent layer 116 is formed in a region of the first electrode part 110, and the anion-exchange membrane 126 is formed in a region of the second electrode part 120. On the contrary, the anion-exchange membrane 126 may be attached to a region of the first electrode part 110, and the adsorbent layer 116 may be formed in a region of the second electrode part 120.

Here, the adsorbent layer 116 is formed with a highly selective adsorbent that adsorbs only specific metal ions. For example, the adsorbent layer 116 may be formed by lithium manganese oxide such as $Li_{1.6}Mn_{1.6}O_4$ for the adsorption of lithium ions, and it is possible to select an adsorbent depending on the type metal ions to be adsorbed and recovered.

For reference, the lithium manganese oxide, $Li_{1.6}Mn_{1.6}O_4$, may be prepared by mixing at least one lithium compound selected from the group consisting of lithium carbonate, lithium hydroxide, lithium nitrate, and lithium acetate and at least one manganese or manganese compound selected from the group consisting of manganese, manganese oxide, and manganese hydroxide, heat-treating the mixture to prepare $LiMnO_2$, and then heat-treating the prepared $LiMnO_2$.

The adsorbent layer 116 may be coated by the same method as the porous carbon electrode layers 114 and 124.

Meanwhile, although not shown in detail, the adsorbent layer 116 may be formed by coating a mixture, be prepared by mixing active carbon, carbon aerogel, or a mixture thereof with lithium manganese oxide, on the current collector layer 112 of the first electrode part 110.

In other words, the first electrode part 110 may comprise only the current collector layer 112 and the adsorbent layer 116, and the adsorbent layer 116 comprises the active carbon and the carbon aerogel to simultaneously perform the function of the porous carbon electrode layer 114.

The insulating layer 130 may be formed with any material that can electrically insulate the first electrode part 110 and the second electrode part 120, and form a gap between the two electrode parts 110 and 120 to allow an aqueous solution containing metal ions to pass therethrough.

Preferably, the insulating layer 130 is formed with nylon non-woven fabric having a pore size of 30 to 300 mesh.

Figure 4:
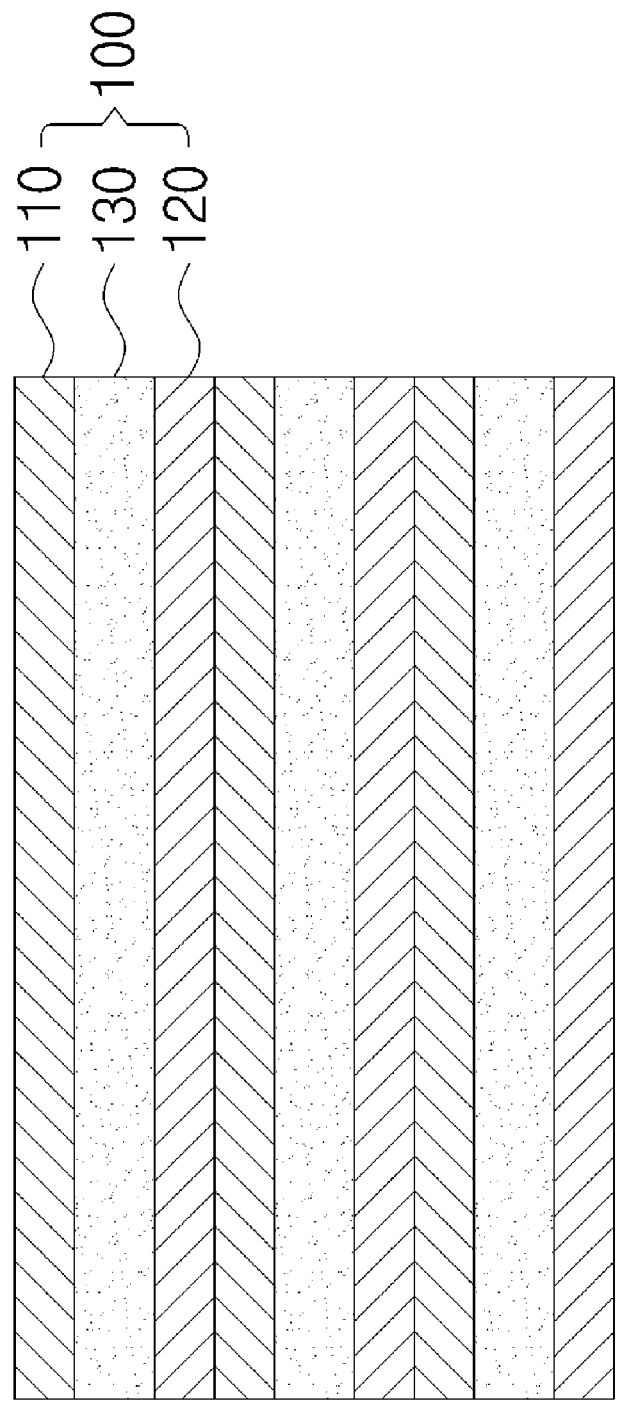
FIG. 4 is a cross-sectional view showing a plurality of electrode modules for recovery of metal ions stacked.
Figure 5:
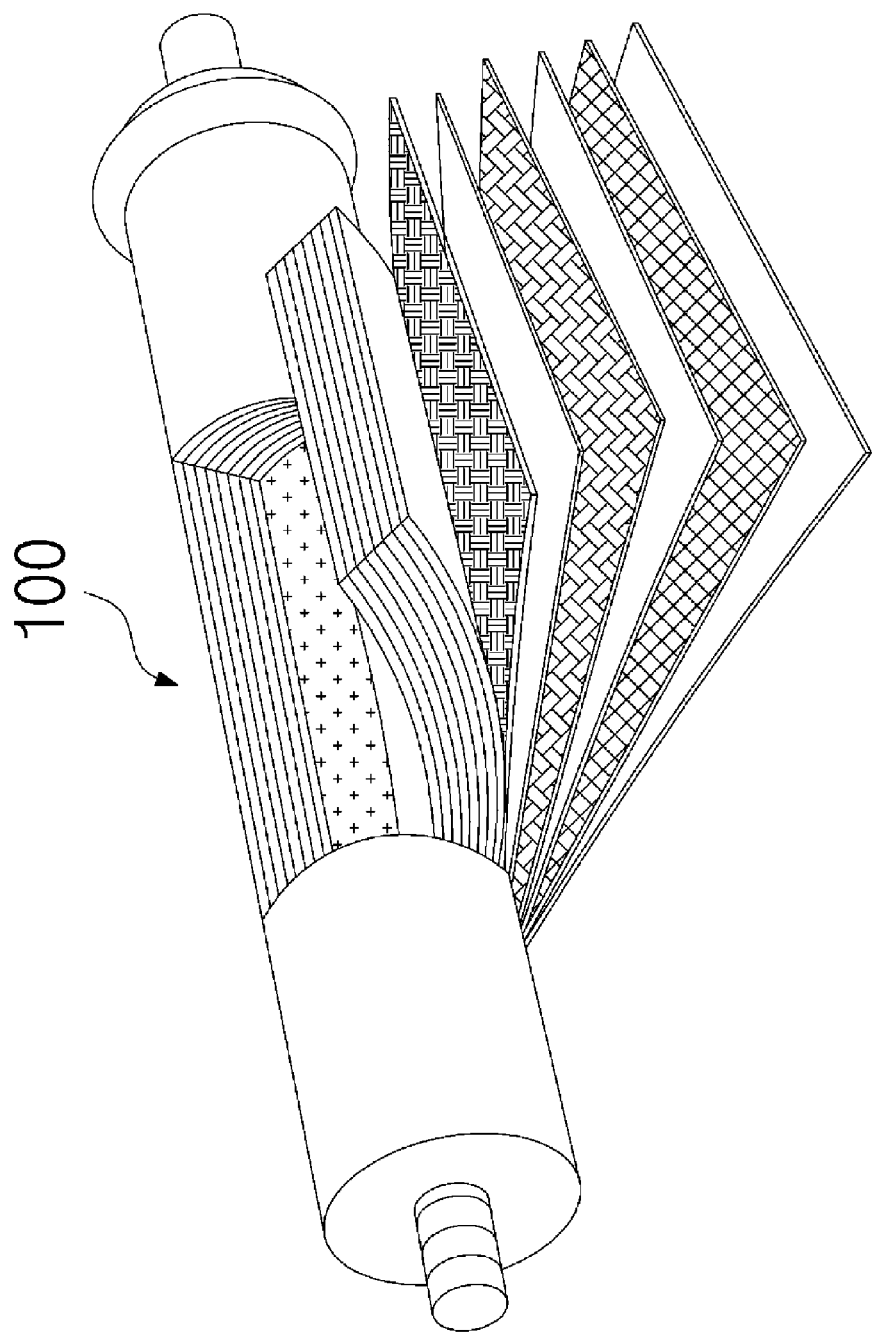
FIG. 5 is a view showing a cylindrical electrode module for recovery of metal ions.

FIG. 4 is a cross-sectional view showing a plurality of electrode modules for recovery of metal ions stacked, and FIG. 5 is a view showing a cylindrical electrode module for recovery of metal ions.

The electrode module 100 manufactured by the above-described method may be formed in the form of a laminate by laminating a plurality of unit modules as shown in FIG. 4 or may be formed in the form of a cylinder by winding one or more unit modules as shown in FIG. 5.

Figure 6:
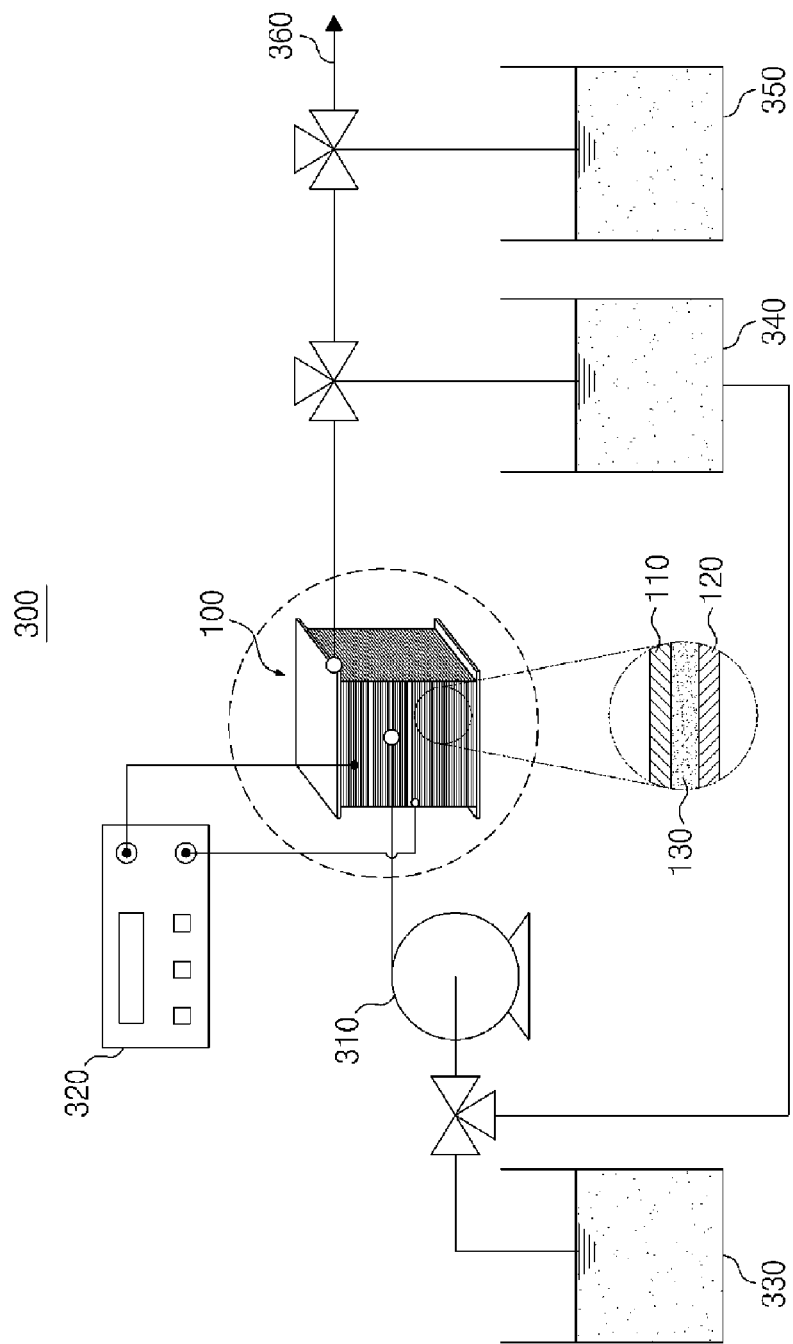
FIG. 6 is a schematic view showing an apparatus for recovery of metal ions in accordance with an exemplary embodiment of the present invention.

FIG. 6 is a schematic view showing an apparatus for recovery of metal ions in accordance with an exemplary embodiment of the present invention.

An apparatus 300 for recovery of metal ions in accordance with an exemplary embodiment of the present invention recovers valuable metal ions from an aqueous solution such as seawater using the above-described electrode module 100 for recovery of metal ions.

The apparatus 300 for recovery of metal ions comprises an electrode module 100 for recovery of metal ions, a metering pump 310, and a power supply 320.

The electrode module 100 for recovery of metal ions used in the apparatus 300 for recovery of metal ions in accordance with an exemplary embodiment of the present invention is the same as that previously described. Although the electrode module 100 for recovery of metal ions in the form of a laminate formed by laminating a plurality of unit modules is shown in FIG. 6, a cylindrical electrode module 100 for recovery of metal ions may be used.

The metering pump 310 feeds a liquid containing metal ions or deionized water into the electrode module 100 for recovery of metal ions.

The power supply 320 supplies electricity to the current collector layers 112 and 122 provided in the first electrode part 110 and the second electrode part 120, respectively.

Figure 7:
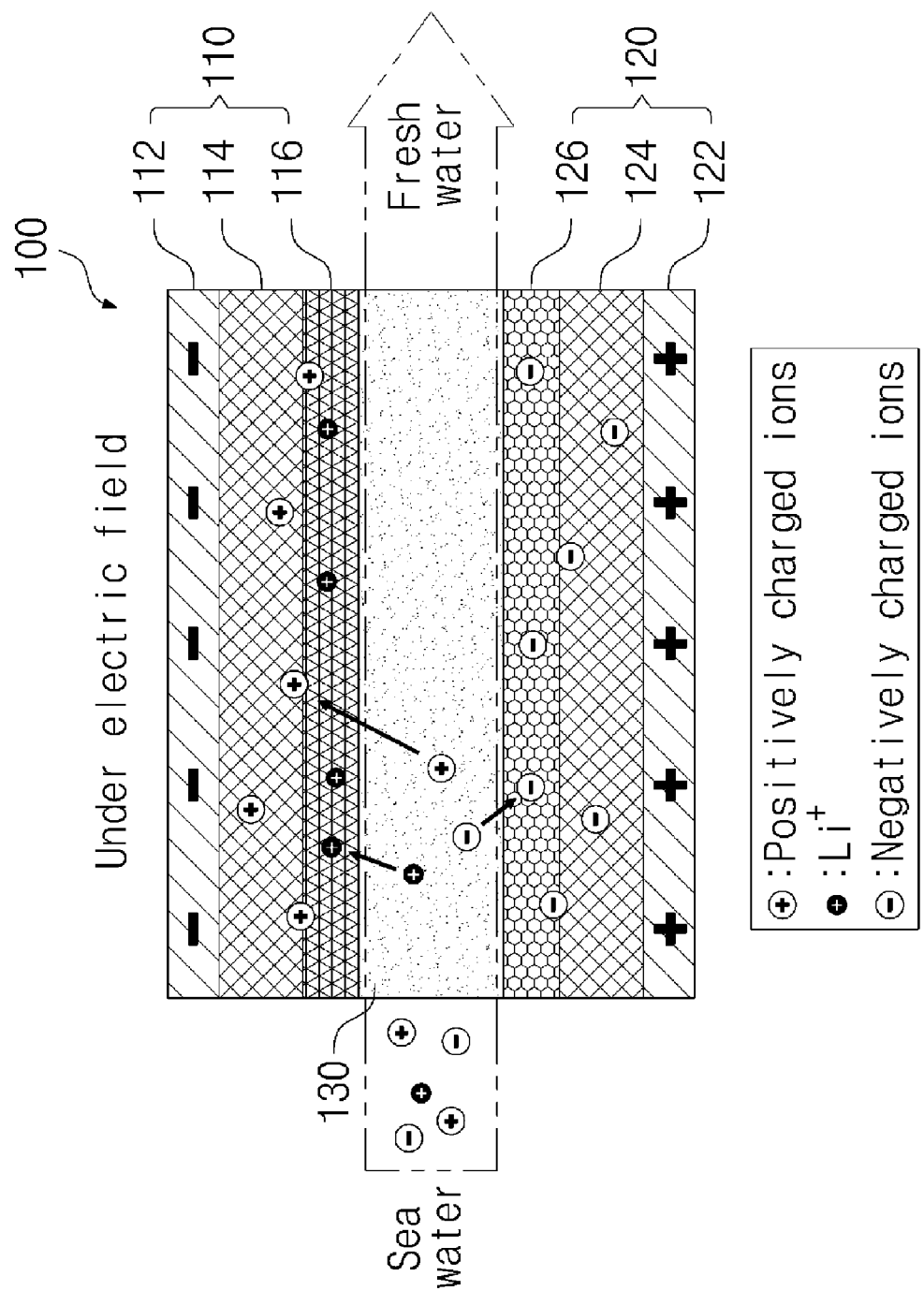
FIGS. 7 to 9 are views showing a process in which metal ions are adsorbed and desorbed in an electrode module for recovery of metal ions of an apparatus for recovery of metal ions in accordance with an exemplary embodiment of the present invention.
Figure 8:
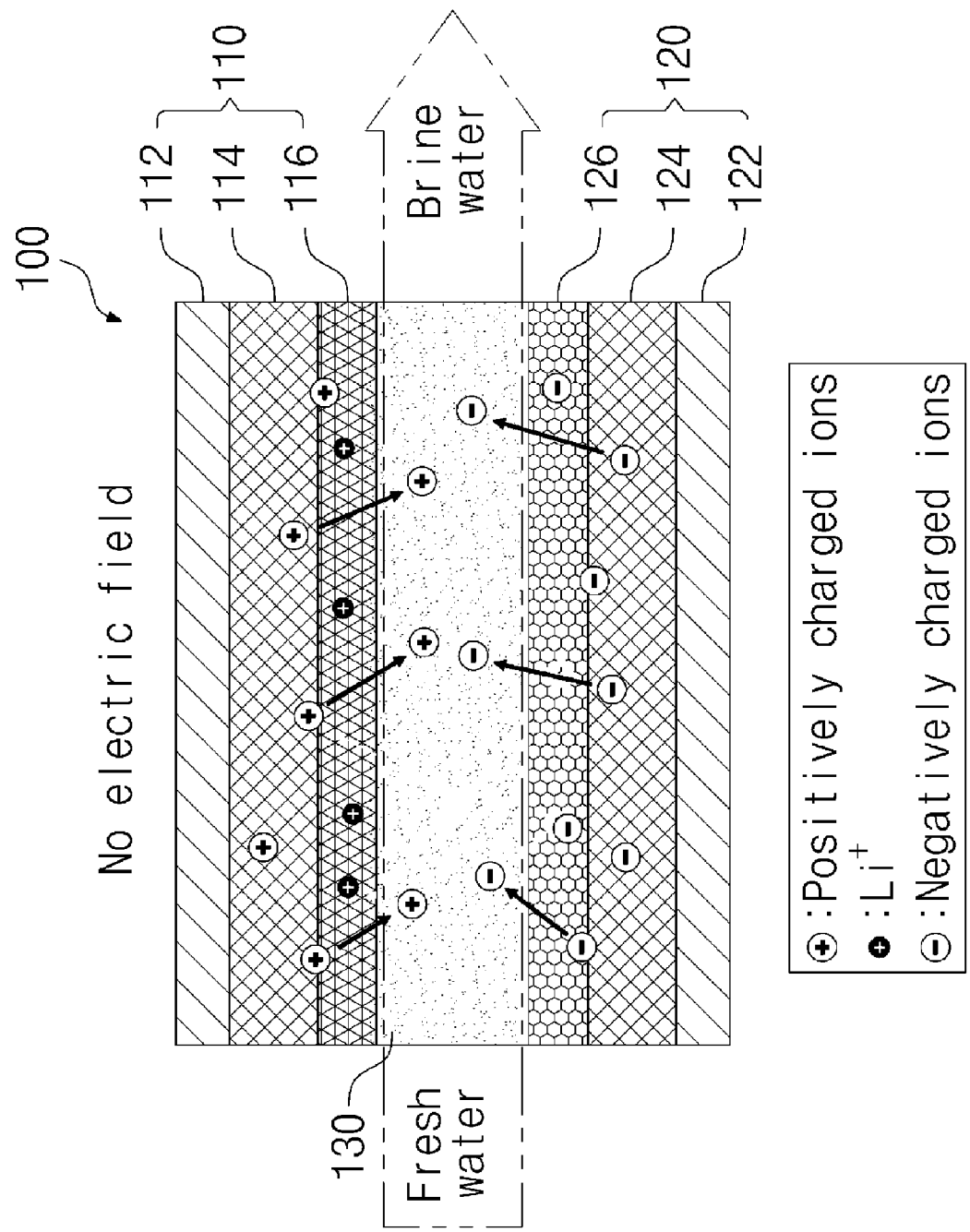
Figure 9:
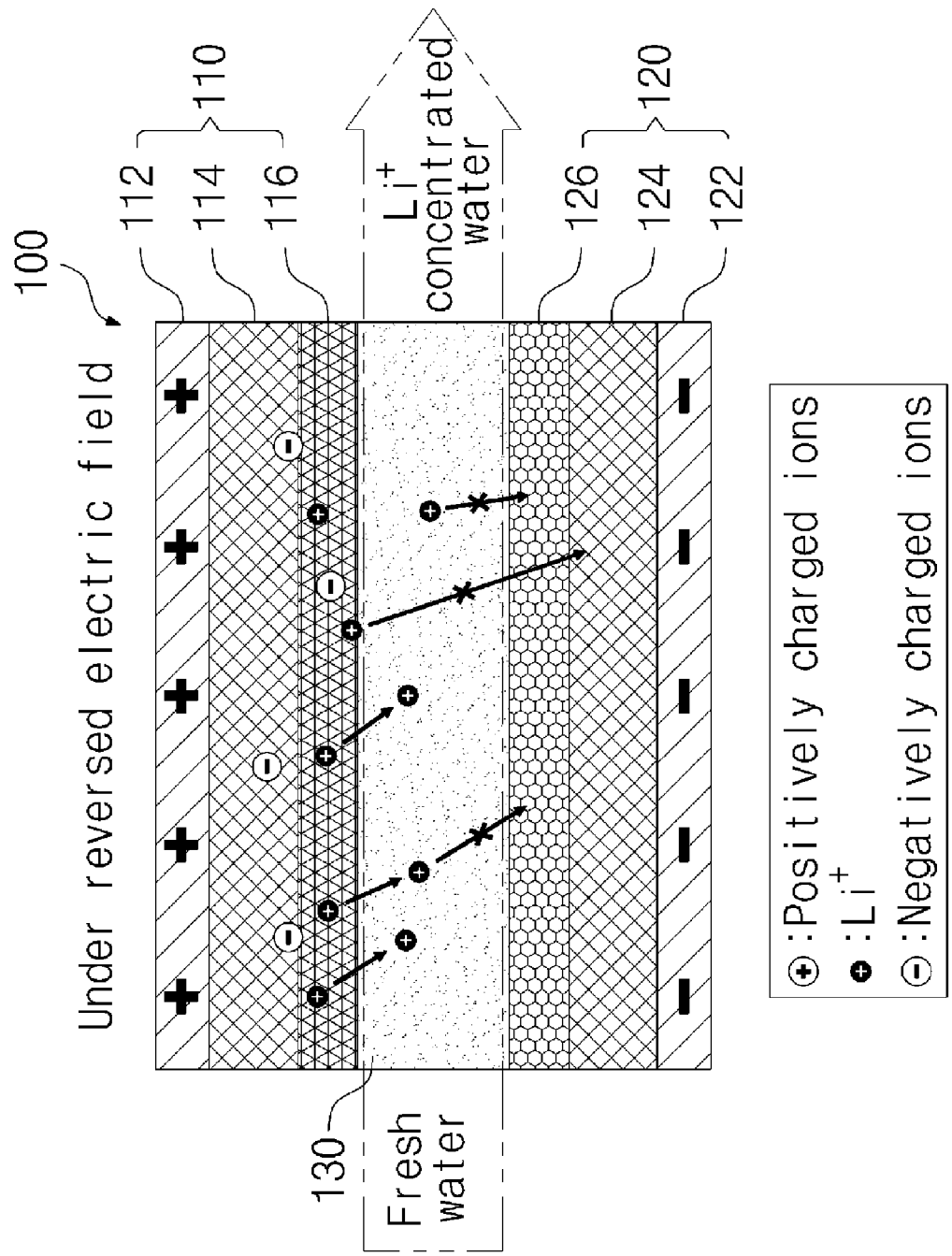

FIGS. 7 to 9 are views showing a process in which metal ions are adsorbed and desorbed in an electrode module for recovery of metal ions of an apparatus for recovery of metal ions in accordance with an exemplary embodiment of the present invention.

Referring to FIGS. 7 to 9, a process in which metal ions, especially, lithium ions ($Li^+$) are recovered from an aqueous solution such as seawater will now be described.

First, as shown in FIG. 7, power is supplied out of the power supply 320 to the electrode parts 110 and 120. That is, a voltage of 0.1 to 2.5 V is applied to the current collector layer 112 as a negative (−) pole of the first electrode part 110 and to the current collector player 122 as a positive (+) pole of the second electrode part 120.

As a result, the porous carbon electrode layer 114 of the first electrode part 110 is negatively charged, and the porous carbon electrode layer 124 of the second electrode part 120 is positively charged.

Then, when an aqueous solution such as seawater, in which valuable metal ions are dissolved, is fed from an aqueous solution container 330 into the insulating layer 130 between the first electrode part 110 and the second electrode part 120, cations and anions in an electrolyte dissolved in the aqueous solution migrate toward the current collector layers 112 and 122, which are charged opposite to each other, by electrostatic attraction.

The phenomenon that occurs at this time is on the same principle of an electric double layer capacitor. The cations migrating to the first electrode part 110 passes through the adsorbent layer 116 having high selectivity, i.e., the adsorbent layer 116 which contains lithium manganese oxide having highly selective adsorption capacity to lithium ions, and is separated from other cations except lithium ions by selective adsorption. Meanwhile, in this process, deionized water from which ions are removed is stored in a first storage container 340.

Next, as shown in FIG. 8, when the voltage applied to the first electrode part 110 and the second electrode part 120 is reduced to 0 V or discharged, the electrostatic attraction of the electrode module 100 for recovery of metal ions disappears. As a result, the ions migrating to the first and second electrode parts 110 and 120 diffuse again to the fluid, and the fluid in which the ions diffuse is discharged through a discharge port 360.

Here, the specific cations, i.e., lithium ions, adsorbed onto the adsorbent layer 116 of the first electrode part 110 remain fixed to the adsorbent layer 116 and do not diffuse to the fluid, and thus the lithium ions are separated from other cations.

While the conventional adsorption process requires a lot of time, the apparatus 300 for recovery of metal ions including the electrode module 100 for recovery of metal ions according to the present invention can significantly reduce the time required for the adsorption of ions and effectively separate only specific ions because of these principles.

Meanwhile, the apparatus 300 for recovery of metal ions in accordance with an exemplary embodiment of the present invention may further comprise an energy storage unit (not shown) for recovering and storing electrical energy discharged during the discharge process described with respect to FIG. 8. Accordingly, it is possible to reuse the recovered electrical energy in the adsorption of metal ions, thus increasing the overall energy efficiency.

Finally, as shown in FIG. 9, the voltage is applied to the current collector layer 112 as the positive (+) pole of the first electrode part 110 and the current collector layer 122 as the negative (−) pole of the second electrode part 120 in a manner opposite to that of FIG. 7, and then the deionized water is recirculated from the first storage container 340.

As a result, the lithium ions, the specific valuable metal ions fixed to the adsorbent layer 116, migrate toward the second electrode part 120 by the electrostatic attraction, are desorbed from the adsorbent layer 116, and then flow into the deionized water.

However, the lithium ions flowing into the deionized water do not migrate to the inside of the second electrode part 120 by the anion-exchange membrane 126, which can selectively permeate only anions, but diffuse to the fluid and are extracted to the outside. The adsorption and desorption of desired valuable metal ions are achieved through this process.

Meanwhile, the fluid containing the extracted lithium ions is stored in a second storage container 350 to facilitate the recovery of lithium ions.

The movement of all fluids is achieved by the metering pump 310 in the apparatus 300 for recovery of metal ions including the electrode module 100 for recovery of metal ions in accordance with an exemplary embodiment of the present invention. However, when the apparatus 300 for recovery of metal ions according to the present invention is incorporated into the conventional adsorption recovery technologies, it is possible to perform the conventional adsorption process by placing the electrode module 100 for recovery of metal ions, to which an electric field is applied, to seawater without the pumping process that entails costs and then perform the above-described electrical desorption process in the ion separation process.

As a result, it is possible to reduce the electrical energy required for the operation of the metering pump 310 and selectively recover only specific ions without performing the acid treatment required in the conventional technologies.

The foregoing description is intended to illustrate the technical spirit of the present invention by way of example only, and it will be apparent to those skilled in the art that various modification, changes, and alternations may be made without departing from the spirit and scope of the present invention. Accordingly, the embodiments disclosed in the present invention and the accompanying drawings do not limit but describes the spirit of the present invention and the scope of the spirit of the present invention is not limited by the embodiments and the accompanying drawings. It will be appreciated that the protection scope of the present invention should be defined by the appended claims and all the spirits within the equivalents should be included in the appended claims.

What is claimed is:

1. An electrode module for recovery of metal ions, the electrode module comprising:
   a first electrode part comprising a current collector layer to which electricity is applied, a porous carbon electrode layer coated on the current collector layer, and an adsorbent layer coated on the porous carbon electrode layer;
   a second electrode part comprising a current collector layer to which electricity is applied, a porous carbon electrode layer coated on the current collector layer, and an anion-exchange membrane attached to the porous carbon electrode layer; and
   an insulating layer interposed between the first electrode part and the second electrode part to electrically insulate the first electrode part and the second electrode part and to allow a liquid to pass therethrough,
   wherein the adsorbent layer and the anion-exchange layer are arranged to face each other.

2. The electrode module of claim 1, wherein the first electrode part comprises a current collector layer, to which electricity is applied, and an adsorbent layer comprising active carbon, carbon aerogel, or a mixture thereof and coated on the current collector layer, wherein the second electrode part comprises a current collector layer, to which electricity is applied, a porous carbon electrode layer coated on the current collector layer, and an anion-exchange membrane attached to the porous carbon electrode layer, and wherein the adsorbent layer and the anion-exchange layer are arranged to face each other.

3. The electrode module of claim 1, wherein the electrode module has the form of a laminate by laminating a plurality of unit modules or has the form of a cylinder by winding one or more unit modules.

4. An apparatus for recovery of metal ions, the apparatus comprising:

an electrode module for recovery of metal ions which comprises a first electrode part including a current collector layer to which electricity is applied, a porous carbon electrode layer coated on the current collector layer, and an adsorbent layer coated on the porous carbon electrode layer, a second electrode part including a current collector layer to which electricity is applied, a porous carbon electrode layer coated on the current collector layer, and an anion-exchange membrane attached to the porous carbon electrode layer, and an insulating layer interposed between the first electrode part and the second electrode part to insulate the first electrode part and the second electrode part;

a power supply which supplies electricity to each of the current collector layers; and a metering pump which feeds a liquid containing metal ions or deionized water into the electrode module for recovery of metal ions.

\* \* \* \* \*